No. 748,845. PATENTED JAN. 5, 1904.
J. F. CONNELL.
APPARATUS FOR SUPPLYING HOT WATER AND STEAM.
APPLICATION FILED JULY 15, 1903.
NO MODEL. 3 SHEETS—SHEET 2.

No. 748,845. PATENTED JAN. 5, 1904.
J. F. CONNELL.
APPARATUS FOR SUPPLYING HOT WATER AND STEAM.
APPLICATION FILED JULY 15, 1903.
NO MODEL. 3 SHEETS—SHEET 3.
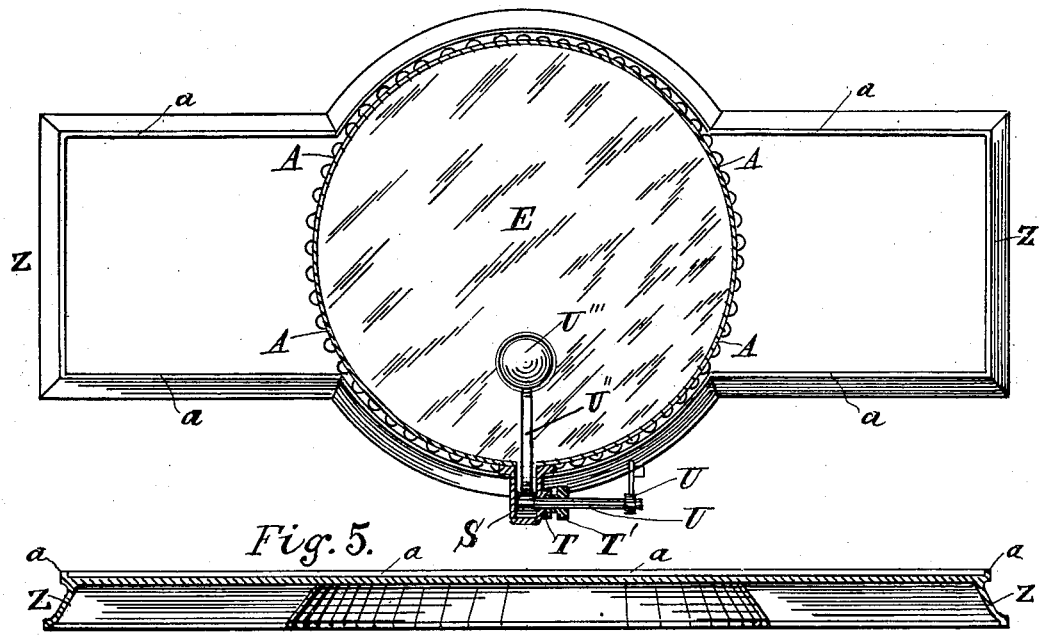
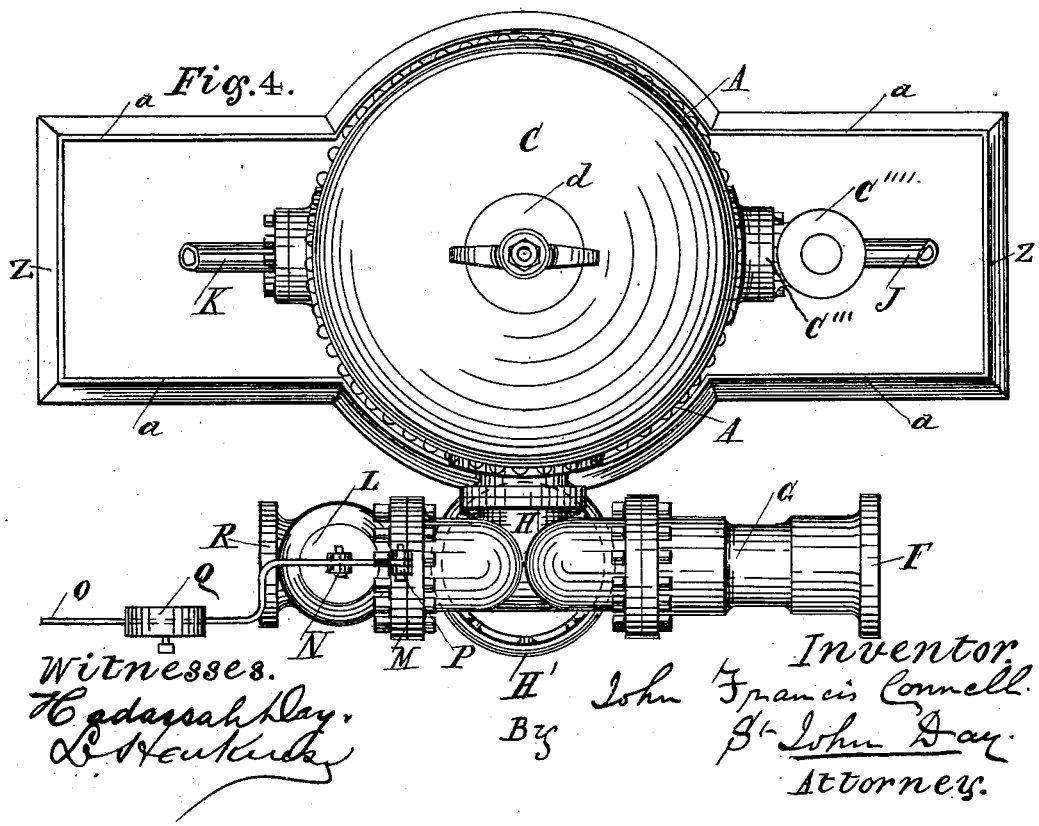
Witnesses. Inventor
John Francis Connell.
By St. John Day.
Attorney.

No. 748,845. Patented January 5, 1904.

UNITED STATES PATENT OFFICE.

JOHN FRANCIS CONNELL, OF LOS ANGELES, CALIFORNIA, ASSIGNOR OF ONE-HALF TO WILLARD H. STIMSON, OF LOS ANGELES, CALIFORNIA.

APPARATUS FOR SUPPLYING HOT WATER AND STEAM.

SPECIFICATION forming part of Letters Patent No. 748,845, dated January 5, 1904.

Application filed July 15, 1903. Serial No. 165,696. (No model.)

*To all whom it may concern:*

Be it known that I, JOHN FRANCIS CONNELL, of the city of Los Angeles, in the county of Los Angeles, in the State of California, have invented a certain new and useful apparatus for supplying hot water and steam to hotels, office-buildings, and the like and hot feed-water to steam-boilers and other devices, of which the following is a full, clear, and exact description or specification, reference being had to the annexed drawings and to the letters marked thereon.

My said invention, which relates to the continuous supply of hot water to the wash-basins or analogous devices used in the apartments of hotels, office-buildings, hospitals, and other large edifices, also relates to supplying steam to the steam heating apparatus used in the apartments, hallways, corridors, and passages of such buildings, mainly consists in adapting apparatus whereinto exhaust-steam from the engines which operate the elevators in such buildings is discharged and recondensed as hot water for being returned to the steam-boilers as hot feed-water.

An essential feature of my said invention consists in effecting the three aforesaid operations by one and the same apparatus instead of by two or more parts of apparatus as hitherto used, with considerable reduction in cost of the apparatus and in the operation of the same to carry out simultaneously the three aforesaid functions of supplying hot water to wash-basins or their analogues, of supplying steam to steam heating apparatus, and of supplying hot feed-water to the boilers which supply steam for driving the pumps which actuate the hydraulic elevators in buildings or edifices of the classes hereinbefore mentioned and their like wherein a series of numerous floors of apartments are arranged above each other.

Figure 1:
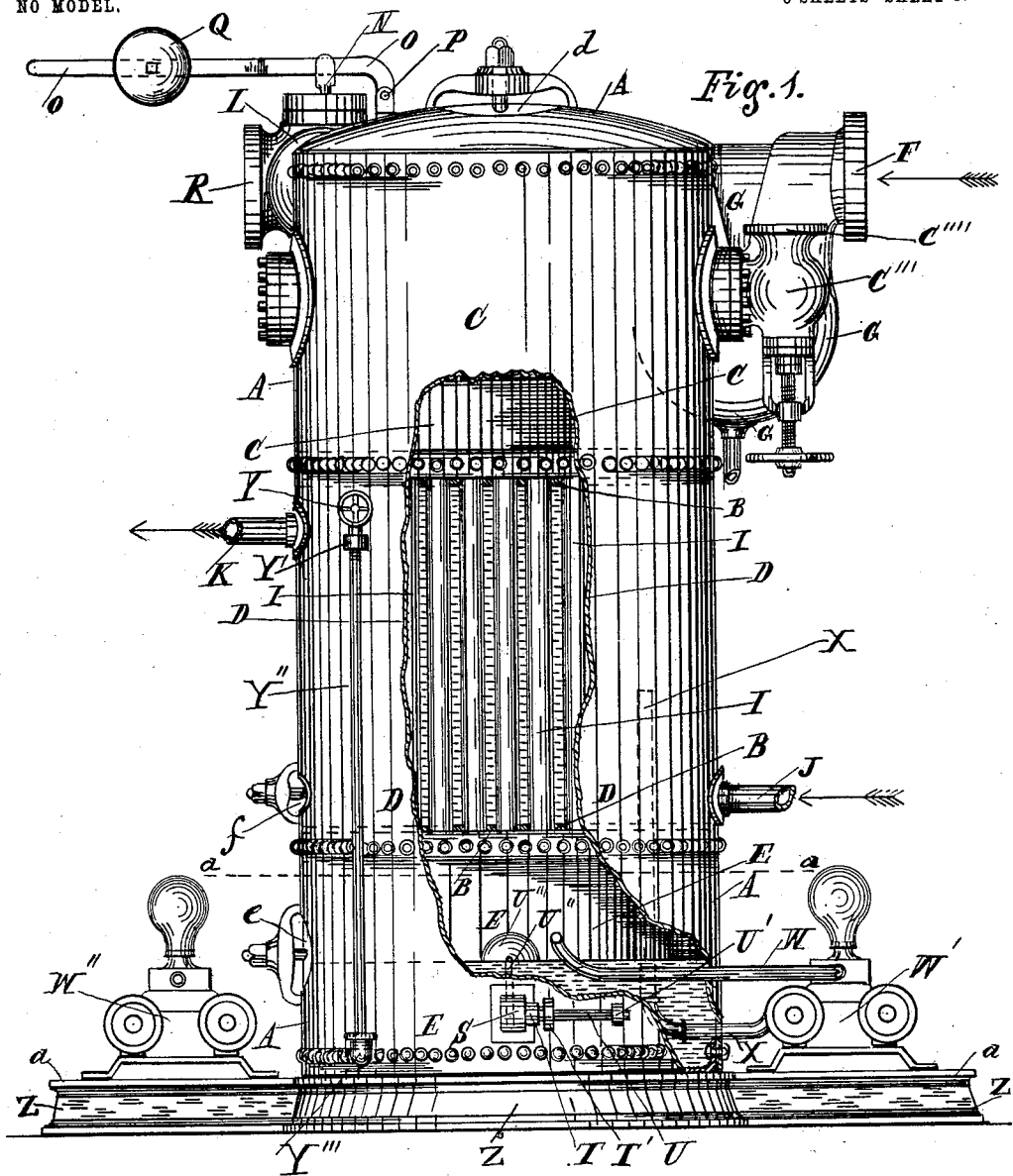
Figure 2:
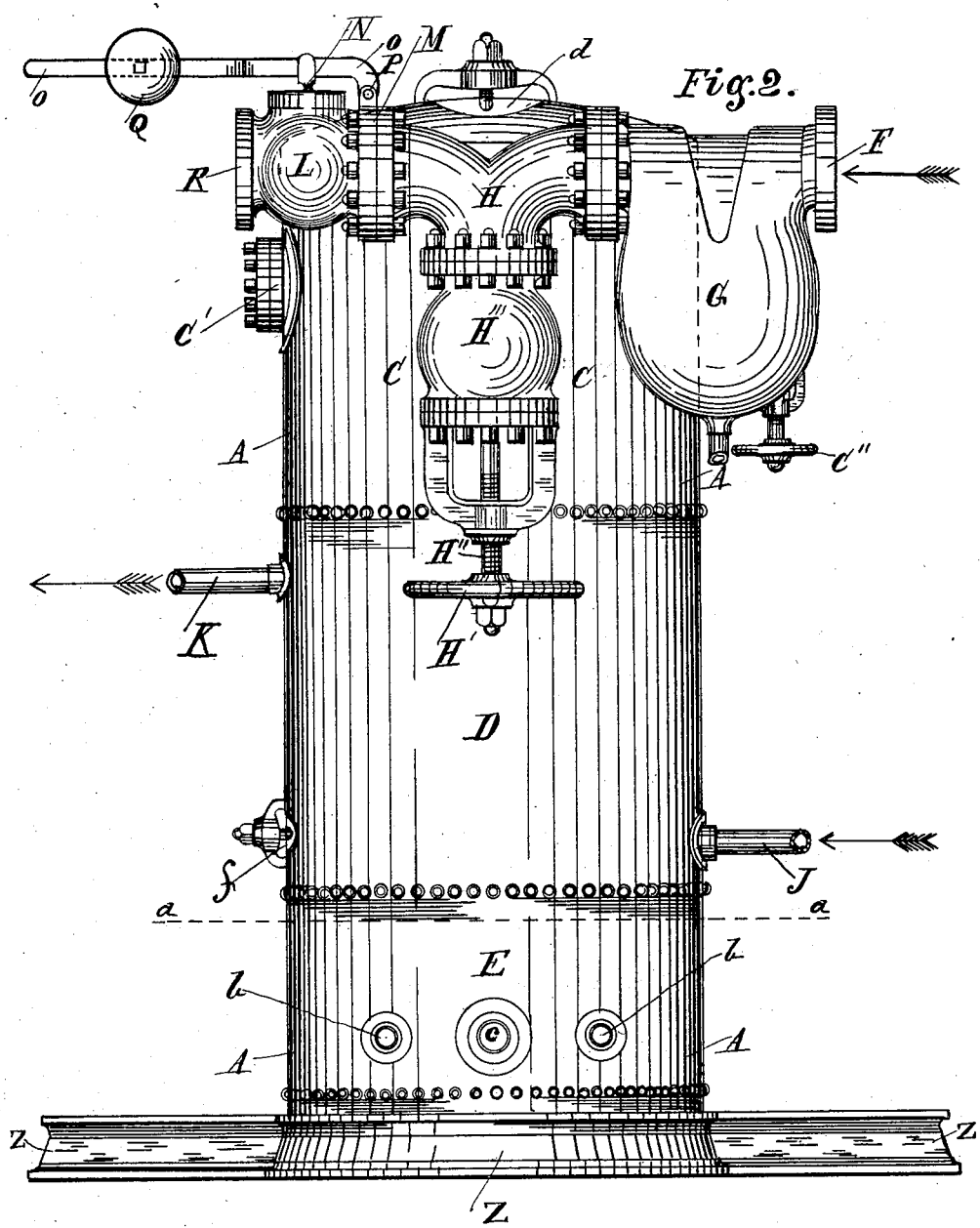

Upon the annexed drawings, Figure 1 is a front elevation, partly in section, of the apparatus constituting my present invention. Fig. 2 is an elevation of the same apparatus looked at from the rear thereof. Fig. 3 is a horizontal section thereof on the line $a\ a$, Figs. 1 and 2, looking downward into the lower compartment or hot-well of the device. Fig. 4 is a plan corresponding to Fig. 2; and Fig. 5 is a longitudinal section of the base or bed upon which the apparatus or device is preferably carried or supported, as hereinafter more particularly set forth.

In the figures of drawings the apparatus or device constituting my invention is shown as consisting of a vertical cylindrical shell, (marked A A,) divided by the tube-plates or sheets B B into three chambers or compartments, (respectively marked C, D, and E.) The tube-plates, also the crown or dome and bottom plate of the shell A A, are held together by rivets, as shown. Into the upper compartment C the exhaust-steam from the engines is led by the exhaust-pipe. (Not shown in the drawings, but which is connected to the flange F of the oil-separator G, which may be an oil-separator of any of the well-known forms of construction, that which I have shown at Figs. 1, 2, and 4 being what is known as an "Austin separator" of the "B" class and standard pattern.) From the branch H (shown at Figs. 2 and 3) of the oil-separator G the exhaust-steam passes into the chamber C, thence down through the tubes I of the intermediate chamber D into the lowest chamber or hot-well E. The tubes I, of which some are shown in Fig. 1, constitute a direct and continuous open series of vertical passages between the exhaust-steam chamber C and the hot-well E, and as the tubes I are numerous enough to occupy practically the entirety of the chamber D with sufficient water-space around and between themselves and between themselves and that part of the external casing A constituting the chamber D it follows that the chamber D is a multitubular chamber which when filled with water contains the water wholly surrounding every tube I.

At the lower part of the chamber D there is a branch pipe J, connected to either the water-mains of a city, to a water-tower, or to other source of supply of water under pressure. At any desired position near to the upper part of the chamber D there is a discharge-pipe K. The water entering by the inlet-pipe J is therefore discharged by the outlet-pipe K, as indicated by the arrows in Figs. 1 and 2. The water entering by the inlet-pipe J as it enters is cold and as it escapes by the outlet-pipe K is discharged as hot water. Because of the water entering by the inlet-pipe J being under sufficient head or pressure the hot water discharged through the outlet-pipe K is forced to any height required in an office-building or hotel or other analogous edifice and is supplied when required to wash-basins, baths, or other receptacles. The water under pressure passing through the multitubular chamber D becomes heated by the condensation of the exhaust-steam from the engines passed into the upper chamber C in the manner hereinbefore described—that is to say, the exhaust-steam while in its hottest condition enters the several tubes I at their upper ends and parting with its contained heat to the water in the chamber D, surrounding the tubes I, in commencing to give out its heat to said water at the hottest part of the chamber D—namely, at the upper end thereof—becomes gradually cooled and condensed as it descends to the lower and therefore colder part of the chamber B from the tubes I, in which it trickles downward as hot water of condensation, which is collected in the lower chamber or hot-well E, as shown at Fig. 1.

The branch H is provided with a chamber L, directly connected thereto by a flange-joint M, as shown at Figs. 1, 2, and 3. This chamber L contains a safety-valve or adjusted blow-through valve, whose detail of construction is not shown in the drawings, because such valve may be of any well-known construction commonly in use, and therefore constitutes no part of my present invention; but the upper end of the spindle or pin N of the valve is shown as being pressed upon by a weighted lever O, centered upon a fulcrum P, the weight Q on the lever O being adjusted in such position upon the lever O as to allow of the exhaust-steam to blow off through an ascending pipe connected to the flange R of the safety-valve casing. In practice the safety-valve is adjusted to allow the exhaust-steam to escape into the atmosphere through the ascending pipe connected to the branch R at a pressure of about two to five pounds per square inch above the atmosphere. Some of the exhaust-steam passes up into the steam-heaters in the apartments, hallways, corridors, and passages of the office-buildings, hotels, or analogous edifices wherein my said invention is used, thereby causing heat to be radiated from the steam-heaters and the buildings to be warmed, one or more separate valves and pipes being connected to my apparatus for thus supplying steam to said heaters.

The water of condensation collected and contained in the lower chamber or hot-well E, as shown in the lower sectional part of Fig. 1, is the hot water which is used as the hot feed-water for supplying the boilers of the engines from which the exhaust-steam is utilized in the manner hereinbefore described.

At the front of the hot-well E there is bolted or riveted the horizontally-projecting chamber S. (More particularly shown in horizontal section at Fig. 4 and in front elevation at Fig. 1.) This chamber S is constructed with a stuffing-box T and gland T', as more particularly shown at Figs. 1 and 4. Through this gland T and stuffing-box T', as in a steam and water tight bearing therefor, there is carried the horizontal shaft U, to the inner end of which the lever U''' is connected, as shown at Figs. 1 and 4. The lever U' has a float U'''' at its outer end, which float is carried in the water in the hot-well E. From this arrangement it follows that as the level of the hot water in the hot-well E rises or falls so the float U'''' correspondingly rises and falls and the shaft U receives a corresponding movement of rotation or angular movement. At the outer end of the short shaft U there is carried the lever U', which is moved correspondingly with the aforesaid rotational or angular motion of the shaft U, and the lever U', being connected to a valve arm or lever of a steam admission and cut-off valve, (not shown in the drawings, for the reason that such valve forms no part of my present invention and the showing thereof would only complicate and render less distinct the parts of the drawings actually constituting my present invention, but which valve is applied at any convenient part of the steam-pipe W shown at Fig. 1,) as it is operated by the rising and falling of the float U'''', causes steam from the boilers to operate the pumping-engine W' when the hot water in the well E has risen to a high level therein, while so soon as the level of the water in the hot-well E has been sufficiently lowered to cause the sinking of the float U'''' to close the valve on the steam-pipe W the operation of the pumping-engine W' stops until sufficient water of condensation from the exhaust-steam has again collected in the hot-well E to again raise the float U'''' to a level sufficient to open the steam-admission valve on the steam-pipe W to again start the engines W' to pump hot water from the hot-well E into the boilers, and so on in such continuity of action and cessation of action in alternation automatically.

For the purpose of preventing escape or loss of heat from the exhaust-steam passing from the pumping-engine W' the exhaust-pipe X from this engine is taken through and into the hot-well E, and this exhaust-pipe X is continued vertically upward, as shown at Fig. 1, into one of the tubes I, whereinto this exhaust-steam is discharged, condensed, and trickles down into the hot-well E.

It is explained that the float-operating-valve apparatus for automatically admitting and shutting off steam to and from the hot-water-pumping engine W', also the hot-water-pumping engine itself, do not of themselves constitute any part of my present invention, but have been hereinbefore described, and in part shown in the drawings, to explain the manner of operating the apparatus or device which does constitute my invention. In Fig. 1 a similar automatic steam-pump W'' is shown on the left-hand side of my apparatus, which may be operated whenever required for feeding hot water or for pumping cold water to any part of a building or edifice in connection with which my invention is used.

As it invariably happens that in all steam-operated mechanism or apparatus wherein the water converted into steam is used in continuous succession or states of water (steam, condensation, and reproduction of hot water) leakage or gradual diminution of the water in the system of such apparatus always takes place, I provide the apparatus constituting my invention with an auxiliary valve and supply-pipe for the purpose of maintaining the loss of water due to such leakage and keeping the quantity of water in the apparatus practically constant. At Fig. 1 I have indicated such auxiliary valve at Y, which shows the end elevation of the hand-wheel and the part of the valve-casing Y' to which the pipe Y'' is connected, this pipe Y'' being coupled at its lower end to the bend Y''', leading into the bottom of the casing A, and therefore into the water constituting the hot-well E. Whenever required, by turning the hand-wheel Y, I open the valve and admit hot water from the upper and hottest part of the chamber D and discharge it into the hot-well E, thereby supplying whatever loss of water in the apparatus which may be due to leakage in the operation of my apparatus.

My apparatus, together with the pumping-engines W' W'', are preferably all carried upon one and the same base or bed Z, as shown in the drawings, and whose horizontal form is more particularly shown at Figs. 3 and 4. This horizontal bed has a special feature of construction, as more particularly shown at Fig. 5—namely, a slight upraised lip $a\ a$ all around the upper edge of the said bed, the purpose or object of this upraised lip being that of a shield or barrier whereby any water or leakage escaping from the apparatus or from the pumps is collected within and upon the top of the bed Z and prevented from spreading over the engine-house floor or other apartment wherein the apparatus is used. At the lower part of Fig. 2 the two openings $b\ b$ are the connections for the pipes (not shown in the drawings) by which the pumping-engines W' W'' are connected to the water in the hot-well E, and the connection $c$ is that whereto the return-pipe from all the steam-heaters is connected whereby the water of condensation from the steam-heaters throughout a hotel or office-building or other edifice is delivered to the hot-well E.

My apparatus is provided with manholes and covers or lids $d$ and $e$, respectively, for access to the interior thereof and with hand-holes and covers or lids, one of which is shown at $f$, for removing scale or other deposit from the water used in the apparatus.

The height of the chamber C is preferably such that any of the tubes I when requiring to be removed may be drawn upward into the chamber C out of the tube-plates B B into the upper chamber C.

My apparatus contains a valve operated by a hand-wheel H' upon the lower end of the stem or valve-spindle H'', which by being turned by hand in either direction opens or closes the valve in the casing H''', and thereby regulates the extent of effectual opening, whereby exhaust-steam flows through the branch H into the chamber C.

My apparatus is also provided with any required number of flange connections C', to any one or more of which a valve operated by a hand-wheel C'', such as that shown at C''', Figs. 1, 2, and 3, is attached, and to the flange C'''' at the upper end of which valve-casing a pipe may be connected for conveying some of the exhaust-steam to any other place or apparatus where it may be desired, particularly to the steam-heater or radiators in a hotel, office-building, or analogous edifice.

Having now described the nature of my said invention and the best system, mode, or manner I am at present acquainted with for carrying the same into practical effect, I desire to observe, in conclusion, that what I consider to be novel and original, and therefore claim as the invention to be secured to me by Letters Patent, is as follows:

1. The apparatus or device consisting of an upper chamber, whereinto exhaust-steam from the engines is conducted, the said apparatus or device having a multitubular chamber below the exhaust-steam chamber, the tubes whereof through which the exhaust-steam descends constituting the sole open communication or passage for the descent of the exhaust-steam into the bottom chamber or hot-well, the multitubular chamber receiving cold water under pressure at the bottom thereof and discharged at its highest temperature at or from the top of said multitubular chamber, the third chamber constituting the hot-well at the bottom thereof, said apparatus being provided with opening and closing valves, and pipe connections between the hot-well and the pumps which draw the hot water and deliver it to steam-boilers, basins and baths, all operating together in the manner and for the purposes substantially as set forth.

2. The apparatus or device consisting of an upper chamber, whereinto exhaust-steam from the engines is conducted, the said apparatus or device having a multitubular chamber below the exhaust-steam chamber, the tubes whereof through which the exhaust-steam descends constituting the sole open communication or passage for the descent of the exhaust-steam into the bottom chamber or hot-well, the multitubular chamber receiving cold water under pressure at the bottom thereof and discharged at its highest temperature at or from the top of said multitubular chamber, the third chamber constituting the hot-well at the bottom thereof, said apparatus being provided with opening and closing valves, and pipe connections between the hot-well and the pumps which draw the hot water and deliver it to steam-boilers, basins and baths, also the valve and supply-pipe connecting the top of the multitubular chamber with the hot-well, all operating together in the manner and for the purposes substantially set forth.

3. The apparatus or device consisting of an upper chamber, whereinto exhaust-steam from the engines is conducted, the said apparatus or device having a multitubular chamber below the exhaust-steam chamber, the tubes whereof through which the exhaust-steam descends constituting the sole open communication or passage for the descent of the exhaust-steam in the bottom chamber or hot-well, the multitubular chamber receiving cold water under pressure at the bottom thereof and discharged at its highest temperature at or from the top of said multitubular chamber, the third chamber constituting the hot-well at the bottom thereof, said apparatus being provided with opening and closing valves, and pipe connections between the hot-well and the pumps which draw the hot water and deliver it to steam-boilers, basins and baths, also the valve and supply-pipe connecting the top of the multitubular chamber with the hot-well, also the pipe connecting the heating apparatus into the apartments, hallways, corridors or passages of hotels, office-buildings or other edifices, all operating in the manner and for the purposes substantially as set forth.

4. The apparatus or device consisting of an upper chamber, whereinto exhaust-steam is conducted, the said apparatus or device having a multitubular chamber below the exhaust-steam chamber, into which multitubular chamber cold water under pressure is admitted at the bottom thereof and discharged as hot water at or from the top of said multitubular chamber, said apparatus having a third chamber constituting the hot-well at the bottom thereof, said apparatus being provided with opening and closing valves, and pipe connections between the hot-well and the pumps which draw the hot water and deliver it to steam-boilers, also the valve and supply-pipe connecting the top of the multitubular chamber with the hot-well, also the pipe connecting with the heating apparatus in the apartments, hallways, corridors or passages of hotels, office-buildings or other edifices; also the base whereon the said apparatus is carried, said base being constructed with a lip for preventing the overflow of water leaking from the apparatus or pumps, used in connection therewith, substantially as set forth.

5. The combination of the exhaust-steam chamber, the multitubular water-heating and exhaust-steam-condensing chamber, the connection at the lower part of the multitubular chamber to water-mains, the water-mains, the connection from the upper part of the multitubular chamber to wash-basins, baths, and like vessels, the water-basins bath and like vessels, the pipe connection for leading exhaust-steam into the heating apparatus in hotels, office-buildings and analogous edifices, the heating apparatus the float-operated mechanism for automatically operating the valve for admitting or shutting off steam from the steam-cylinders of the automatic hot feed-water pumping-engines, the pumping-engines, the safety or blow-off valve, the oil-separator through which the exhaust-steam passes into the exhaust-steam chamber, the valve for regulating the passage of the exhaust-steam into the exhaust-steam chamber, all operating together in the manner and for the purposes substantially as set forth.

In testimony whereof I have hereunto set my hand and seal in the presence of two subscribing witnesses.

JOHN FRANCIS CONNELL. [L. S.]

Witnesses:
 ST. JOHN DAY,
 HADASSAH DAY.